US010669045B1

(12) United States Patent
Cockrell et al.

(10) Patent No.: US 10,669,045 B1
(45) Date of Patent: Jun. 2, 2020

(54) AFFORDABLE VEHICLE AVIONICS SYSTEM

(71) Applicant: USA as Represented by the Administrator of the National Aeronautics and Space Administration, Washington, DC (US)

(72) Inventors: James Joseph Cockrell, Santa Cruz, CA (US); Max Michael Briggs, Palo Alto, CA (US); David James Mayer, Newark, CA (US); Aaron James Cohen, San Jose, CA (US)

(73) Assignee: United States of America as Represented by the Administrator of the NASA, Washington, DC (US)

( * ) Notice: Subject to any disclaimer, the term of this patent is extended or adjusted under 35 U.S.C. 154(b) by 81 days.

(21) Appl. No.: 15/630,795

(22) Filed: Jun. 22, 2017

Related U.S. Application Data (60) Provisional application No. 62/353,518, filed on Jun. 22, 2016.

(51) Int. Cl.
*B64G 1/00* (2006.01)
*B64G 1/36* (2006.01)

(52) U.S. Cl.
CPC .............. *B64G 1/002* (2013.01); *B64G 1/36* (2013.01); *B64G 1/366* (2013.01)

(58) Field of Classification Search
CPC ........... B64G 1/002; B64G 1/36; B64G 1/366
See application file for complete search history.

(56) References Cited

U.S. PATENT DOCUMENTS

| 6,089,507 A | * | 7/2000 | Parvez | B64G 1/1085 244/158.8 |
| 6,246,960 B1 | * | 6/2001 | Lin | G01C 21/165 701/472 |
| 6,341,249 B1 | * | 1/2002 | Xing | B64G 1/1085 701/13 |

(Continued)

OTHER PUBLICATIONS

Baek, Jeong-Ho et al. "Real-Time Trajectory Estimation of Space Launch Vehicle Using Extended Kalman Filter and Unscented Kalman Filter." J. Astron. Space Sci. 22(4), 501-522 (2005).

(Continued)

*Primary Examiner* — Frederick M Brushaber
(74) *Attorney, Agent, or Firm* — Rhys W. Cheung; Robert M. Padilla (57) ABSTRACT

A system and method of providing an affordable navigation, guidance and control system for arbitrary nano/micro launch vehicles by integrating commercial grade sensors with advanced estimation algorithms in a manner that provides sufficient accuracy of the resulting vehicle state estimates to inject nano/micro satellites into low earth orbits. The system and method uses commercial grade sensors and an advanced sensor-fusion estimator software that estimates and removes the estimated measurement errors and filters noise produced by the commercial grade sensors, resulting in estimated states with suitable accuracy. The filtered data are sent to a guidance and control system where actuator commands are formulated based on the filtered data. A simulated launch and flight of the launch vehicle is performed using the filtered data to validate that the GNC system and launch vehicle are ready for launch.

11 Claims, 6 Drawing Sheets

(56) References Cited

U.S. PATENT DOCUMENTS

| | | | | |
|---|---|---|---|---|
| 6,859,170 | B2* | 2/2005 | Devereux | G01C 21/00 |
| | | | | 342/357.29 |
| 9,302,793 | B2* | 4/2016 | Ghofranian | B64G 1/646 |
| 2004/0075605 | A1* | 4/2004 | Bradford | G01S 7/4004 |
| | | | | 342/95 |
| 2017/0349301 | A1* | 12/2017 | Bezos | B64G 1/002 |

OTHER PUBLICATIONS

Cockrell, James J. "NASA Affordable Vehicle Avionics (AVA): Common Modular Avionics System for Nano-Launchers Offering Affordable Access to Space." NASA FS-2015-03-03-ARC (Apr. 22, 2015).

* cited by examiner

AFFORDABLE VEHICLE AVIONICS SYSTEM

CROSS-REFERENCE TO RELATED APPLICATIONS

This application claims the benefit of U.S. Provisional Application No. 62/353,518, filed Jun. 22, 2016, which is hereby incorporated by reference in its entirety.

ORIGIN OF INVENTION

The invention described herein was made in the performance of work under a NASA contract and by (an) employee(s) of the United States Government and is subject to the provisions of Public Law 96-517 (35 U.S.C. § 202) and may be manufactured and used by or for the Government for governmental purposes without the payment of any royalties thereon or therefore.

BACKGROUND OF INVENTION

1. Technical Field of the Invention

This invention relates generally to the field of nano, micro and small space systems and specifically technology for substantially reducing avionics cost for a wide variety of launch systems while maintaining orbit-injection performance and reliability that is consistent with low-earth-orbit space launch. The invention reduces the navigation, guidance and control avionics costs by an order of magnitude compared to conventional approaches, wherein advanced data fusion algorithms and software enable use of commercial off the shelf (COTS) marginally-accurate low-cost sensors and data processors when integrated into a closely-coupled system.

2. Description of Related Art

Public and private nano/micro space launch developers attempt to reduce the cost of propulsion, but conventional high-performance, high-reliability avionics remain the disproportionately high cost driver for launch, wherein high cost is driven by the need for accurate navigation and robust data processing.

The disclosed invention, Affordable Vehicle Avionics (AVA) system, can perform as well or better than conventional Guidance, Navigation and Control systems (GNCs), and at a fraction of the conventional GNCs recurring costs. The AVA system enables nano/micro-launch providers to offer affordable rides to low earth orbit (LEO) as primary payloads, which means that nano/micro-satellite payloads can better afford to specify their own launch and orbit parameters, without the orbital constraints posed by ride-sharing or the burden of cost prohibitive components, design and execution.

The quality, consistency, and reliability of sensor and processing technology of non-aerospace industries has improved such that their products may now be used in traditionally aerospace applications. Fixed costs, such as sensors and processors, can be drastically reduced by utilizing non-aerospace, commercial off the shelf (COTS), industry products integrated into the AVA system through use of parameterized data-fusion and state estimation software, which can be used to build a common suite of avionics and software that can be used by several different launcher providers. This facilitates utilizing economies of scale to further lower costs.

State-of-the-Art Guidance, Navigation and Control systems (GNCs) typically cost more than the target costs for small launch vehicles ("Nano/Micro-Launchers") and their low-cost payloads. The small launch vehicle industry needs affordable, responsive, modular, common avionics systems that are easily adapted to a wide family of Nano-Launchers.

Conventionally, each small launch vehicle designer develops its own proprietary hardware and software system for each space-launcher version, and then tailors its software to support each flight, so costs of these unique flight systems do not benefit from economies of scale and certain software costs unnecessarily recur for every launch. The flight systems and associated software costs are a significant portion of the cost of each launch. High-end GNC avionics flight systems can cost between $2 M and $5 M, depending on functionality. Recurring software development can cost over $1 M per flight for unique launch conditions, vehicle configuration, trajectory programming, staging and deployment sequencing, safety analysis, reviews, and tests. The disclosed AVA system drastically reduces these recurring costs using an adaptable, fully-documented software and hardware tuning approach for each launch and each vehicle configuration.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

SUMMARY OF THE INVENTION

The present invention provides low-cost COTS-based GNC avionics hardware designed to survive the severe vibration loads imposed by space launch, data-fusing navigation software that removes sensor measurement errors, robust guidance & control software that commands and controls accurately-known flight variables and a method of tuning the guidance and control software to adapt it to fly any Nano/Micro space launch vehicle design in a large spectrum of low-earth-orbit missions. The steps necessary to provide this low-cost GNC avionics subsystem include providing commercial-grade sensors for measuring position (3×1), velocity (3×1), magnetic field vector orientation (3×1), angular velocity (3×1) and acceleration (3×1) and providing advanced sensor-fusion estimator software. The sensor-fusion estimator software provides minimum-variance estimates of the space launch vehicle (SLV) position, velocity, acceleration and sensor-error states while accommodating noise and bias errors produced by the commercial grade sensors. The error-corrected, estimated state data are then sent to the guidance and control system.

The present invention also provides a method of adapting the AVA system to provide guidance and control services for any nano/micro space launch vehicle design in any feasible mission desired by the flight services operator. The SLV developer provides a suitable avionics hardware system composed of COTS GPS receiver, Inertial Measurements Unit (IMU) with angular velocity, acceleration and magnetic field-vector 3-axis sensors, and a small digital processor with Input/Output ports as needed to service external interfaces, i.e. the AVA subsystem. The AVA flight software described above is pre-compiled and loaded into AVA non-volatile memory, and then initialized by loading a file of adaptation data, the values in which are pre-determined for each nano/micro launch vehicle design/parameter set using a documented procedure and specified custom and COTS software tools. Prior to loading the adaptation datafile, it is tested and statistically characterized in a simulation model of the AVA embedded software and the subject host launch vehicle flying the desired mission as part of the AVA prelaunch acceptance procedure.

The present invention further provides an avionics subsystem having launch vehicle embedded GNC flight software and at least one commercial grade sensor for measuring position, velocity, magnetic field, angular velocity and acceleration vectors. The GNC flight software includes an advanced sensor-fusion-based state estimator that reduces sensor measurement errors, and guidance and control software for controlling the launch vehicle, wherein the guidance and control software receives estimated, bias-corrected data from the advanced sensor-fusion estimator software.

In one aspect of the invention, there is provided a method of adapting an affordable vehicle avionics (AVA) system to guide and control an arbitrary nano/micro launch vehicle. The method includes: using prescribed procedures and design/analysis software for determining the filter coefficients and proportional-integral-differential (PID) gains of a linear guidance and control subsystem that satisfy safety-prescribed gain and phase margins; using an adaptable parameterized and graphically-editable 6DOF suitably-nonlinear simulation for evaluating performance of the arbitrary nano/micro launch vehicle which is navigated, guided and controlled by the AVA, wherein analysis-determined filter coefficients and PID gains are combined with launch vehicle mass, propulsion and aerodynamic parameters and uploaded to the 6DOF simulation; and, using a design prescription for an AVA hardware-in-loop test system for verifying an AVA flight software parameter file to be uploaded to AVA embedded software of the arbitrary nano/micro launch vehicle prior to launch.

In another aspect of the present invention, there is provided a method for providing affordable and effective navigation, guidance and control avionics for an arbitrary nano/micro launch vehicle. The method includes: providing commercial grade sensors; and, compensating for inaccuracies of the commercial grade sensors by fusing sensor data from the sensors in advanced estimation software, such that the navigation, guidance and control avionics assures accuracy and robustness of ascent of the arbitrary nano/micro launch vehicle to low earth orbit. The commercial grade sensors are of commercial-off-the-shelf (COTS) industrial or tactical-class form, driven to small cost, size and weight by mass commercial production. The advanced estimation software comprises an Extended Kalman Filter initialized by a QUEST attitude-quaternion batch estimator. Also, the advanced estimation software provides minimum-variance estimates of the arbitrary nano/micro launch vehicle's position, velocity, acceleration and sensor-error states while accommodating noise and bias errors produced by the commercial grade sensors. Furthermore, the advanced estimation software provides error-corrected, estimated state data and wherein the error-corrected, estimated state data are sent to the navigation, guidance and control avionics before launch of the arbitrary nano/micro launch vehicle as well as during flight of the arbitrary nano/micro launch vehicle. In one embodiment, the arbitrary nano/micro launch vehicle of the present invention is a rocket.

In yet another aspect of the present invention, there is provided a method for controlling a space launch vehicle. The method includes: providing commercial grade sensors for measuring position, velocity, magnetic field, angular velocity and acceleration of the space launch vehicle; providing an advanced sensor-fusion estimator software that estimates errors and filters noise produced by the commercial grade sensors to produce suitably accurate state data for guidance and control of the space launch vehicle; sensing data using the commercial grade sensors; filtering the data sensed by the commercial grade sensors using the advanced sensor-fusion estimator software; sending the filtered data to a guidance and control system of the space launch vehicle; and, processing the filtered data by the guidance and control system to generate actuator commands to control the space launch vehicle. The commercial grade sensors are commercial-off-the-shelf sensors. The advanced sensor-fusion estimator software includes an Extended Kalman Filter initialized by a modified QUEST attitude quaternion estimation algorithm. The method further includes verification of stability and control of the space launch vehicle by simulating its launch and flight using a six degrees-of-freedom simulation model.

These and other advantages are achieved in accordance with various illustrative embodiments of the present invention as described in detail below.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the illustrative embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

The present invention provides an Affordable Vehicle Avionics (AVA) system that has been developed to include GNC sensors, digital processor with I/O ports suitable for guiding, controlling and telemetering flight data, and specialized error-compensating GNC flight software integrated with the sensors and digital processor in a manner that provides satisfactory injection of nano/micro-satellites into low earth orbits emphasizing greatly reduced avionics cost with acceptable performance. AVA exploits advanced sensor-fusion estimator software to estimate sensor errors as state, which are used to compensate for low commercial-grade sensor inaccuracy. The AVA system incorporates commercial, off-the-shelf (COTS) sensors, already proven by global industries that have achieved adequate levels of quality control and reliability in their products. As will be disclosed in more detail below, the AVA system also utilizes model-based integration, adaption, and adjustment of the AVA system control steps, or tuning, as necessary for a host launch vehicle. The AVA system also tests stability and performance of each launch vehicle design and mission application in simulated flights using easily re-configurable, 6-degree-of-freedom ("6DOF") models in computer simulations. The tuning process of the AVA system can be done by any desired launch vehicle vendor by completing the specific method steps of the AVA system tuning process, which streamlines integration of AVA into the host launch vehicle for each specified launch mission, thus significantly reducing recurring costs before hardware is ever installed in the actual launch vehicle.

The AVA system utilizes an Extended Kalman Filter (EKF) that exploits known coupling between GPS receiver, IMU and magnetometer measurements to estimate and remove persistent sensor measurement errors, effectively fusing GPS position and velocity data, IMU angular velocity and acceleration data and local measurements of the body-coordinates orientation of the Earth's magnetic field vector to provide unbiased, accurate estimates of the vehicle's position, velocity, and angular velocity vectors that are needed to guide and control the launch vehicle into orbit. Performance precision is verified prior to launch through computer simulations based on generic 6DOF simulation models that are "tuned" to represent any actual nano/micro launch vehicle.

Instantiating a specific launch vehicle in AVA, such as a rocket, can be a semi-automated process of tuning the AVA software parameters and then testing and verifying the AVA system performance in hardware-in-loop simulations, leading to rapid, efficient integration with desired launch vehicles. Using the disclosed AVA system can save vehicle integrators recurring costs (cost per launch), which can equate to an order of magnitude lower cost than any available, conventional avionics subsystems.

Many commercial developers have attempted to produce new system technology, or modify sounding rockets, to meet the market demand for low-cost launch services capable of inserting 1 kg-100 kg payloads (nanosats at 1-10 Kg, microsats at 10-100 Kg) into Low Earth Orbit. However, conventional commercial vehicle developers have typically been focused on reducing cost and improving reliability of propulsion systems as so persist in using conventional avionics subsystem that cost 10 times as much as AVA. In contrast, the disclosed AVA system meets the needs for a variety of venders, with extremely low cost avionics and low recurring cost. By utilizing the disclosed AVA system, launch service providers are able to profitably launch small, inexpensive payloads into orbits desired by the payload developers on their own schedule, at cost commensurate with the payload.

Small satellites are becoming ever more capable of performing valuable missions for both government and commercial customers. However, currently these satellites can only be launched affordably as secondary payloads. This makes it difficult for the small satellite missions to launch when needed, to the desired orbit, and with acceptable risk. The AVA system enables a class of low-cost launchers, so that launch costs to low Earth orbit (LEO) are commensurate with payload costs.

Significant contributors to the cost of launching nano-satellites to orbit are the avionics and software systems that steer and control the launch vehicles, sequence stage separation, deploy payloads, and telemeter data. The high costs of these Guidance, Navigation and Control (GNC) avionics systems are due in part to the current practice of developing unique, single-use hardware and software for each launch vehicle design and tailoring the software for each mission. High-performance, high-reliability inertial sensor components with heritage from legacy launchers are the primary drivers of GNC avionics costs.

Figure 1:
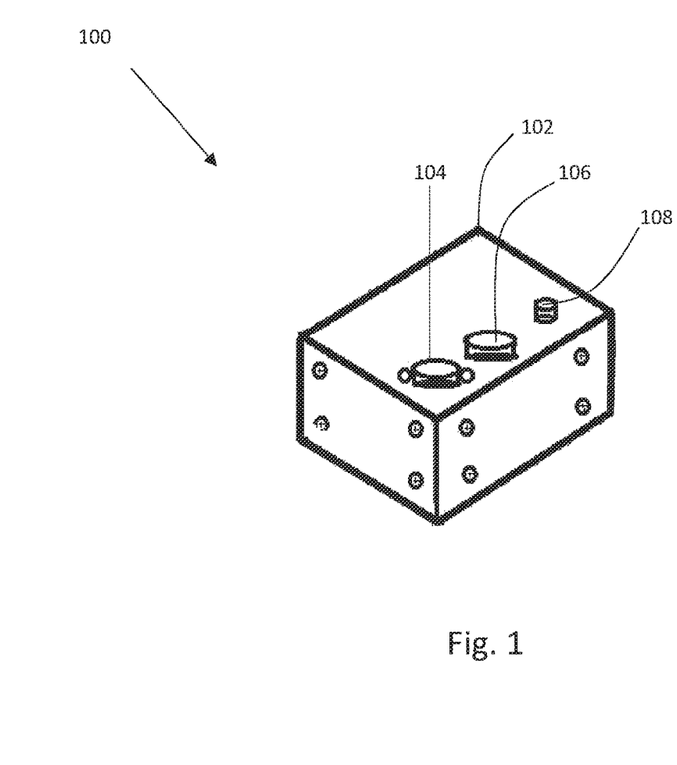
FIG. 1 is a perspective external view of the AVA GNC Avionics subsystem of the present disclosure.

As shown in FIG. 1, the AVA system includes a low-cost avionics package 100 for space launch vehicles that provides complete GNC functionality in a package that includes a housing 102 that can be smaller than 100 mm×120 mm×69 mm, with a mass of less than 0.84 kg. The avionics package 100 includes a plurality of data ports 104, 106 and 108 that can adequately accommodate data input and output demands of the AVA system. Additionally, the avionics electrical power demand can be less than 5 W, with a total hardware cost of less than $10,000 and total system cost of less than $100,000 including labor cost for integration with the launch vehicle.

The hardware components of the AVA system can also include GNC components, inertial measuring units (IMU), magnetometer (Mag), high rate gyros (HRG), GPS, and a battery pack of 6 Ah. The software of the AVA system can include, sensor processing, navigation, 15 state Extended Kalman Filter (EKF), guidance and control, and actuator allocation, for example.

The AVA system takes advantage of commercially available, low-cost, mass-produced, miniaturized sensors, fusing and correcting their measurements using an Extended Kalman Filter. The goal of the AVA system is to produce and flight-verify a common suite of avionics and software that delivers affordable, capable GNC and telemetry avionics with application to multiple nano/micro-launch vehicles at about 1-10% the cost of current state-of-the-art avionics.

The AVA system has been successfully demonstrated to survive a launch environment, as verified in testing labs. Simulations using digital models of rockets guided by the AVA system demonstrate that it achieves all functional requirements under a variety of simulated launch conditions, as will be disclosed in more detail below.

Non-aerospace COTS sensors and industry products have greatly improved over the last decade and launch costs can be lowered by having common avionics made available to several launch providers. The AVA system provides a modularized design to enable use on multiple vehicles and provide order of magnitude cost reduction. The AVA system's use of COTS hardware paired with advanced filtering software allows for hardware cost reduction. The AVA system also supports reduced new-vehicle adaptation times through use of the documented adaptation procedure and software tools, testing via model-based development utilization and automated code generation procedures.

Figure 2:
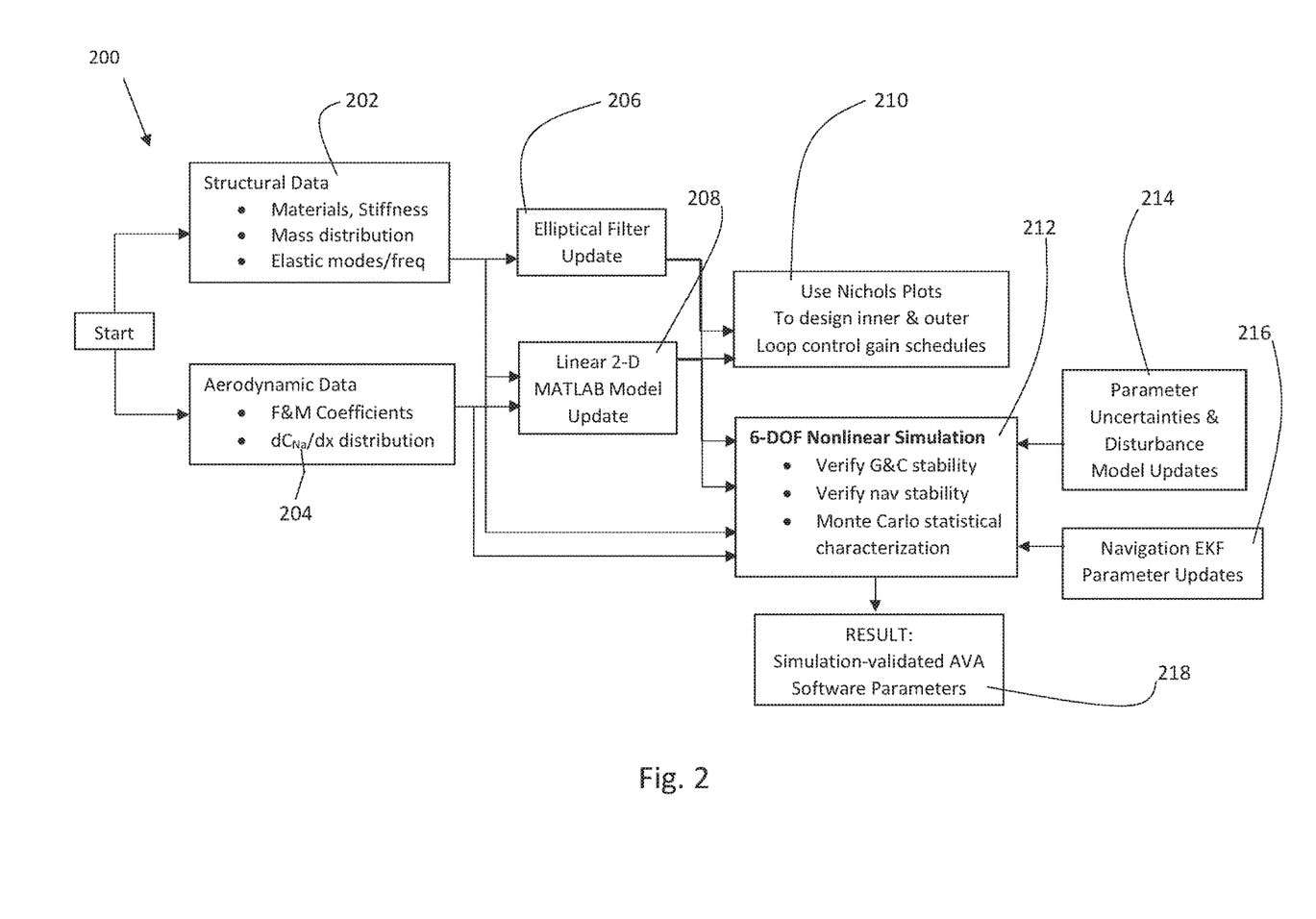
FIG. 2 is a flow diagram of the tuning procedure developed for the present invention.

FIG. 2 illustrates a flow diagram of an AVA system adaptation procedure 200. The adaptation procedure enables a user to utilize the disclosed software algorithm to adapt the hardware (COTS sensors) and flight control software, to specifically customize guidance and control for a specific desired launch vehicle. This adaptation or "tuning" procedure 200 is accomplished prior to acceptance of AVA to launch of the launch vehicle that is verified by a specified, predetermined simulation procedure.

The tuning procedure 200 begins with the input of prerequisite data of the launch vehicle, specifically, structural data 202, including material, stiffness, mass distribution, elastic modes and frequencies; and aerodynamic data 204 including force and moment aerodynamic coefficients and longitudinal distribution of normal force coefficient, for example. These structural data are then entered into a low-pass filter algorithm, used to suppress excitation control-excitation of structural modes. The filter design data can be input into an elliptical filter 206, and represented in a linear 2-D MATLAB (or comparable program) model of the pitch and yaw guidance/control loops and the roll control loop 208, which is used in a Nichols linear time-invariant process 210 to design proportional and integral angular-velocity control system gains that provide specified gain and phase margins. The control gains 210 are combined with the low-pass filter design 206 and the vehicle propulsion, mass and aerodynamic properties 202 and 204, parameter uncertainties 214 and EKF parameter updates 216 within the 6DOF model 212 of the launch vehicle, and the 6DOF model 212 is operated in Monte-Carlo mode to statistically characterize and verify guidance accuracy, flight control stability and orbit-injection performance of the space launch vehicle as guided and controlled by AVA. The 6DOF Monte-Carlo performance assessment process accounts for uncertainty and variations in vehicle parameters, launch and flight conditions, such as wind profiles, aerodynamics, thrust misalignments, and off-nominal propulsion performance, for example.

Prerequisite data can also be input directly into the nonlinear simulation 212 if the data values are known a priori, including updates of parameter uncertainties 214 and EKF parameter updates 216. These parameter uncertainties 214 can be frequently updated as the launch vehicle design matures to ensure a higher confidence in launch vehicle and launch environment conditions.

A key component of the tuning procedure 200 is the use of navigation Extended Kalman Filter updates 216. The loosely-coupled Extended Kalman Filter 216 has been extensively applied by those in the avionics industry, but includes special features that have not been used in GNC avionics for Space Launch Vehicles which enables the use of COTS sensors. The Extended Kalman Filter 216 filters out sensor noise and enables a higher quality and performance and more accurate COTS sensors. The Extended Kalman Filter 216 is executed at a fast rate to continuously update state estimates used for guidance and control, converging on sensor error corrections and state vector values within a few seconds. The Extended Kalman Filter 216 is also integrated into the nonlinear 6DOF simulation 212, wherein it received simulated sensor inputs and generates error-corrected guidance and control parameter estimates just as it does when running as embedded software within the AVA hardware, enabling accurate and reliable performance assessment using the simulation 212 results.

Figure 3:
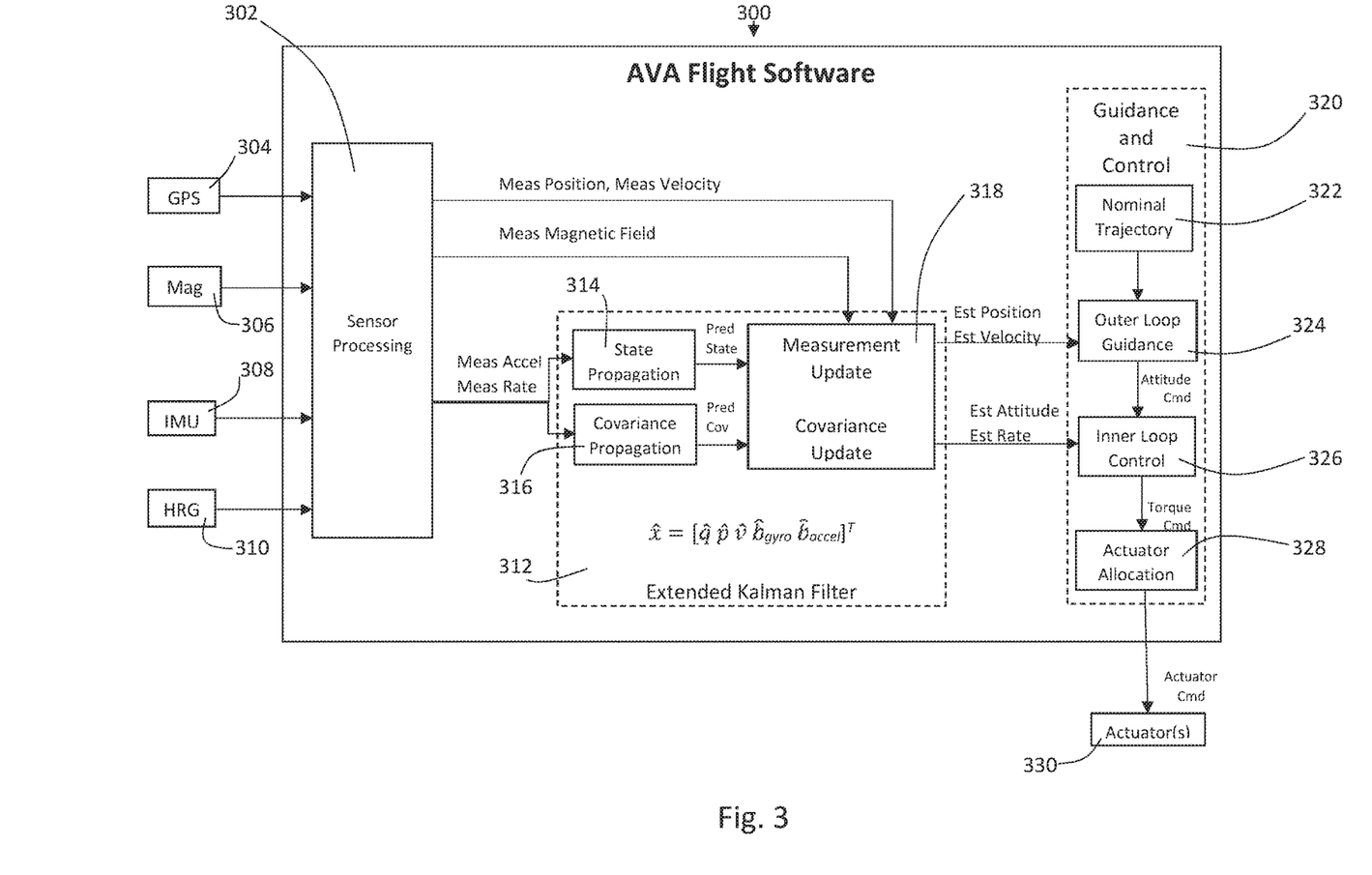
FIG. 3 is a functional block diagram of an AVA GNC flight software of the present invention.

FIG. 3 illustrates another block diagram which represents the sensor fusion estimator software 300 for use in the AVA system. The software process 302 receives measurements from a variety of low cost COTS sensors, for example, Global Position receiver (GPS) 304 inertial position and velocity, Magnetometer (Mag) 306 orientation of the earth's magnetic field vector in launch vehicle body coordinates, Inertial Measurement Unit (IMU) 308 acceleration and angular velocity in body coordinates, and High Rate Gyros (HRG) 310 angular velocity in body coordinates. The sensor data is subjected to processing 302 to correct the measurements for location effects and calibration parameters and then input into the Extended Kalman Filter 312. The Extended Kalman Filter (EKF) 312 processes the data to propagate a 15-element state vector 314 and covariance propagation 316, forms a return difference between the propagated and measured states 318 to which a corrective Kalman gain is applied to generate corrections to the state vector and covariance estimates. The state vector is comprised of 15 terms: the inner 3-vector part of the quaternion [3×1, wherein the scalar part q4 is determined from the quaternion unit-length constraint], inertial position [3×1], inertial velocity [3×1], gyro bias [3×1] and accelerometer bias [3×1], wherein the bias terms are used within the filter to correct measurements, resulting in accurate estimates of the state vector and covariance terms. Since the launch vehicle dynamics are nonlinear and the EKF constitutes system of equations that locally linearize the solution, the AVA invention enhances robustness of an otherwise disturbance-prone solution by initializing or re-initializing the state vector with the attitude solution from a well-known minimum-two-vector "batch" attitude-quaternion determination method known as "QUEST", wherein the inertial and body acceleration vectors are measured respectively by the GPS receiver and the IMU, and the magnetic vector is measured in body coordinates by the magnetometer.

The guidance and control subsystem 320 then processes the estimated states data and the prelaunch-calculated nominal flight-path and azimuth angle trajectory 322 in an outer loop guidance feedback-control algorithm 324 to generate either an altitude or an angular velocity command, as appropriate for the vehicle's control policy, which is then input to the inner attitude-control loop 326 along with the estimated altitude and estimated angular velocity. The inner loop 326 then applies a feedback-control algorithm to generate torque commands applied to multiple actuators 330 as allocated to the design 328 which are attached and integrated on the desired launch vehicle, which control the flight of the launch vehicle.

The flight software 300 is continuously updated and processes sensor data at a suitably high rate to provide continuous course corrections and commands to the launch vehicle actuators 330. Another advantage of the use of the Extended Kalman Filter 312, is that it can process sensor data at a rate that is fast enough to control a launch vehicle during flight and be able to constantly update course correction commands.

Figure 4:
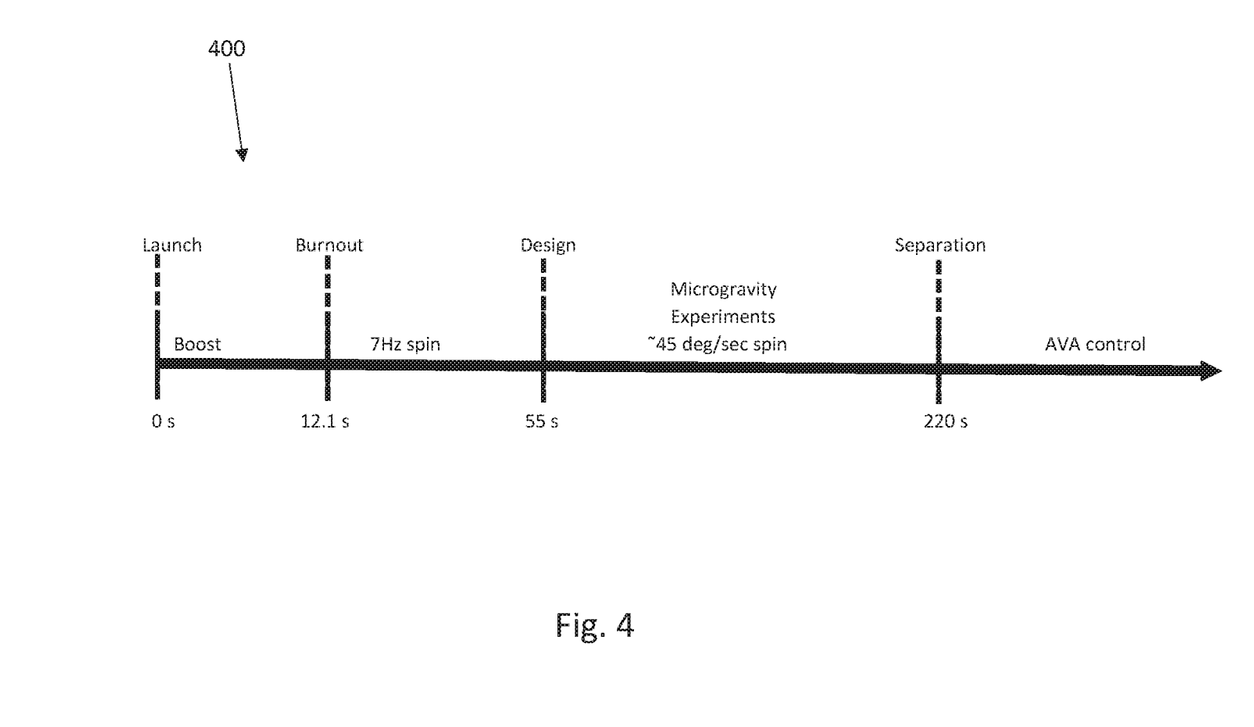
FIG. 4 is a line diagram of a flight sequence of a launch vehicle utilizing an AVA system of the present disclosure.

FIG. 4 illustrates an exemplary timeline diagram 400 of a flight of a spin-stabilized suborbital-launch vehicle utilizing the disclosed AVA system to reduce the spin-rate to a maximum value of 45 deg/sec, and then control the vehicle attitude through trajectory apogee and the high-altitude portion of descent. The disclosed timeline diagram 400 identifies the exemplary timing of launch, burnout, deadspin, and separation events. The timeline diagram also illustrates the AVA system will control the launch vehicle attitude after separation. The launch (t=0 sec) includes an acceleration activated onboard determination of launch time backed up by initial break-wire activation induced by initial rocket (launch vehicle) movement.

The launch event initiates navigation and is followed by aerodynamic spinup to 7 Hz to provide rocket spin-stabilization during stage 1 ascent during which navigation continues. Then, yo-yo deadspin occurs (t=55 sec) down to a roll angular velocity of 45 deg/sec or less. Finally, booster separation (t=220 sec) occurs and AVA control immediately initiates, following booster separation, and removal of residual roll angular velocity occurs concurrently with 3-axis attitude control of the rocket's payload.

Figure 5:
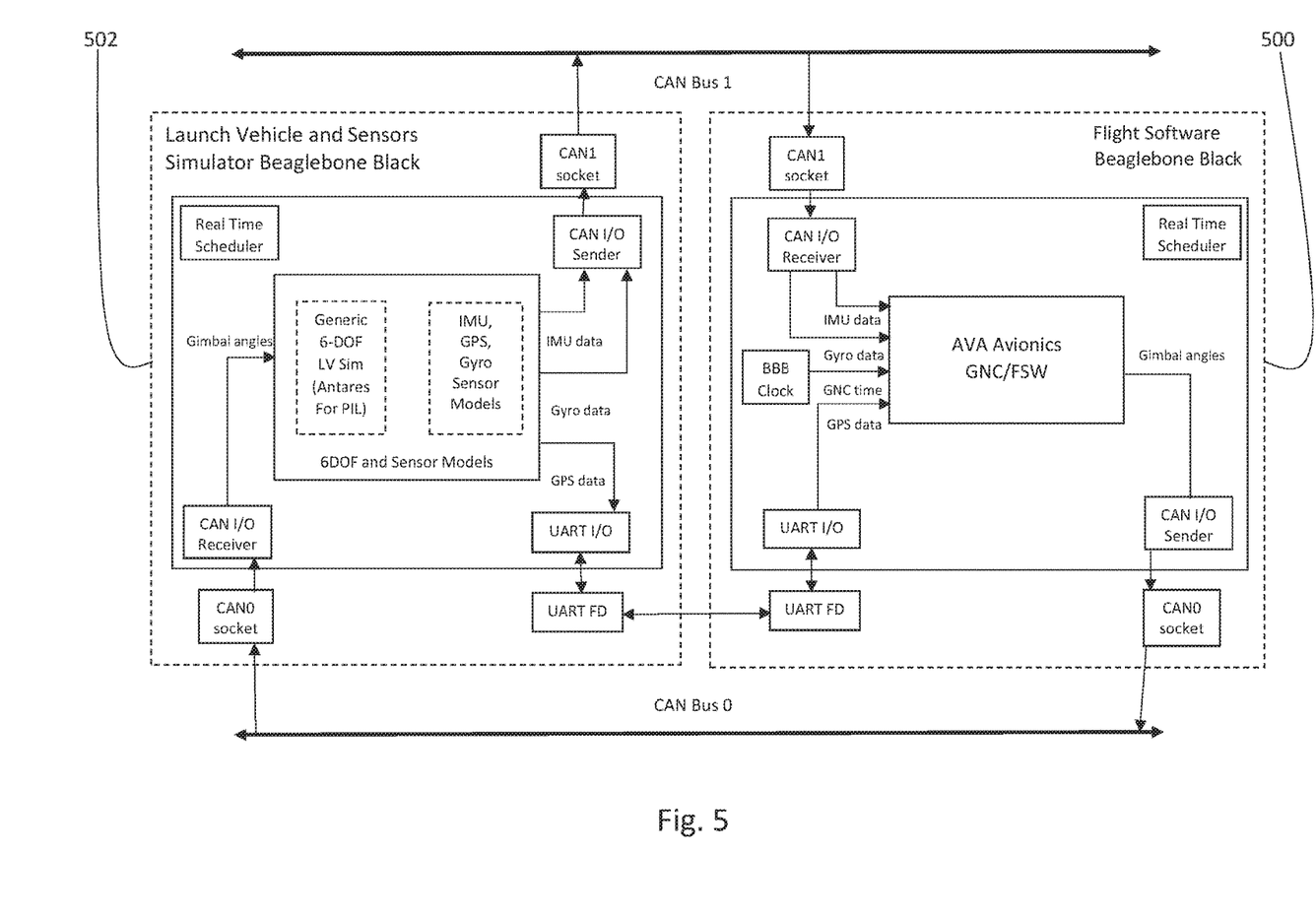
FIG. 5 is a functional block diagram of a simulator test system for hardware-in-loop testing of an AVA system of the present disclosure.
Figure 6:
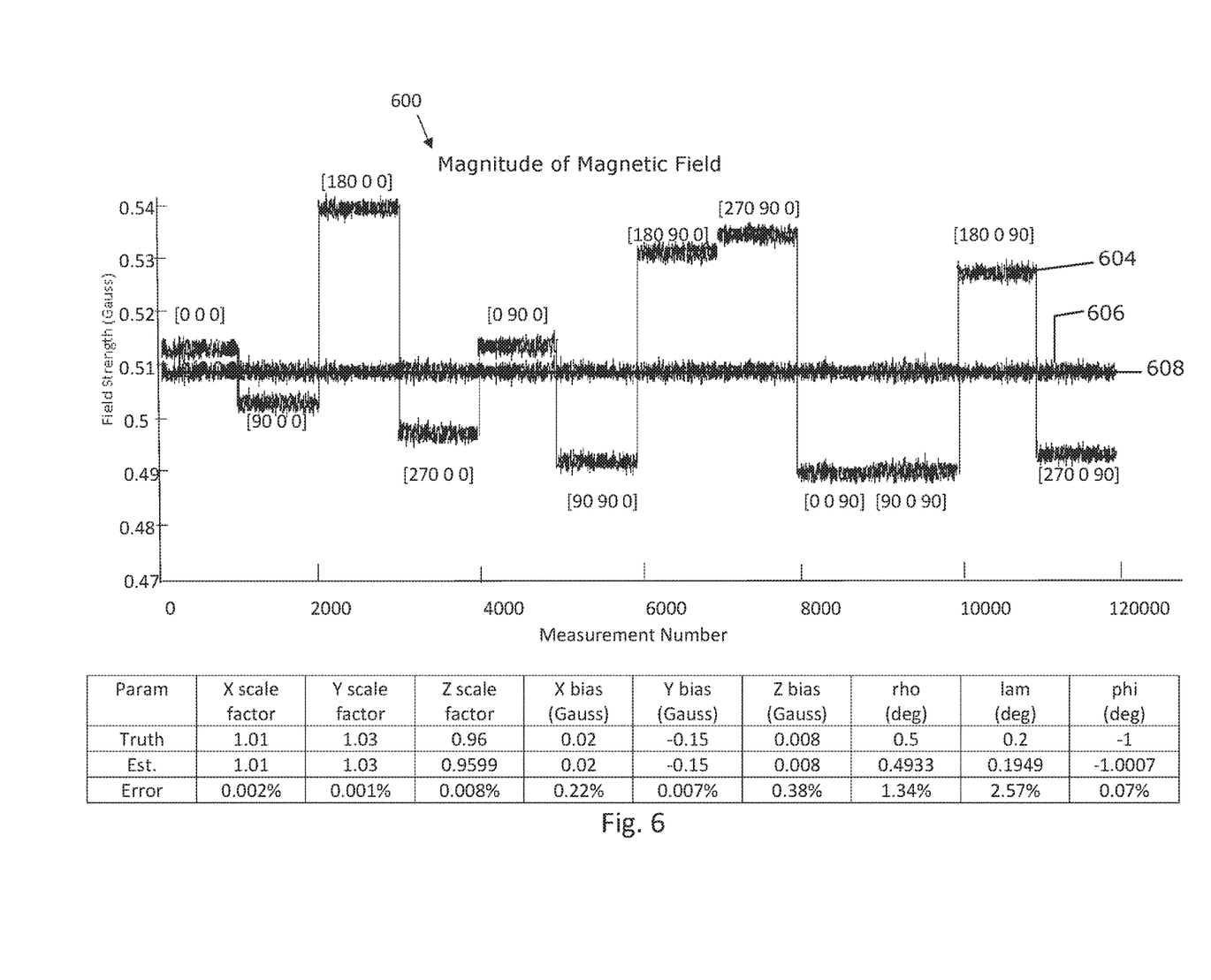
FIG. 6 is a graph and table of results of a magnetometer calibration utilizing the AVA system of the present disclosure.

FIGS. 5 and 6 illustrate simulation-driven hardware-in-loop testing that has been done on the disclosed AVA GNC subsystem to confirm the accuracy and dependability of the AVA subsystem, wherein the AVA hardware and software accepts connector-compatible serial digital data input of emulated 6DOF-simulation-driven sensor measurements and outputs actuator commands back to drive the 6DOF launch vehicle simulation while issuing telemetry data over an AVA serial output port. Specifically, FIG. 5 illustrates a block diagram of a hardware-in-loop (HIL) test system connected to an AVA flight unit with its embedded flight software installed and with the AVA flight software 500 utilizing input simulation-driven emulated IMU, Gyro, GNC, and GPS sensor outputs as inputs to the EKF software filtering the sensor data and processing the data according to the AVA system and software disclosed above. AVA outputs actuator commands to the launch vehicle 6DOF vehicle dynamics and sensors simulator 502 via a serial digital interface, thereby providing a closed-loop AVA test system. The launch vehicle 6DOF simulator is driven by the actuator commands from the AVA software 500 and it passes relevant launch vehicle state parameter data to the embedded real-time sensor models which generate sensor output data in the connector-compatible digital form expected by the AVA flight software, thus completing a simulator test loop.

FIG. 6 illustrates AVA calibration test results obtained during multiple-orientation magnetometer calibration 600 with the 3 components of the AVA true orientation vector listed above, each of the 11 data intervals shown. Calibration data obtained at multiple AVA orientations are processed to perform hard-iron corrective calibration of the magnetometer data. The 11 magnetic field strength vector measurements shown in FIG. 6 are processed by a calibration algorithm to produce the calibration-correction results shown in the corresponding measurement and error table 602. The AVA system measures three orthogonal components of the earth's magnetic field strength using a COTS sensor, and these raw detected data are represented by 604. The raw data 604 are then converted to a magnetic field vector expressed in body-coordinates that is used in the AVA EKF as 3 components of the EFK measurement vector. The raw data 604 are filtered using the AVA system, including the Extended Kalman Filter, which results in the corrected measured norm 606.

In the illustrated test in FIG. 6, the actual true magnitude of the magnetic field was already known, to act as a baseline measurement to compare against the AVA system results. The actual magnitude of the magnetic field is represented by 608. Similarly, the table 602 represents the actual scale factors, bias estimates and Euler angles and compares them against the scale factors biases and Euler angle measured by the AVA system. Table 602 also include an error percentage for each measurement to make it simple to see that the calibrated AVA magnetometer achieves acceptable attitude measurements within a few percent of the true attitude values, which is adequate to produce accurate attitude quaternion estimates when fused with the other sensor measurement by the EKF.

In the foregoing Detailed Description, various features of the present disclosure are grouped together in a single or limited illustrative embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed illustrative embodiment. Thus, the following claims are hereby incorporated into this Detailed Description of the Disclosure by this reference, with each claim standing on its own as a separate illustrative embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of adapting a vehicle avionics system to guide and control an arbitrary nano/micro launch vehicle, the method comprising:
   receiving input of launch vehicle prerequisite data for determining filter coefficients as filter design data for low-pass filter design;
   representing the low-pass filter design in a linear model of launch vehicle pitch and yaw guidance control loops and roll control loop;
   generating proportional-integral derivative (PID) gains based on the linear model that satisfy safety-prescribed gain and phase margins;
   combining the low-pass filter design, the launch vehicle prerequisite data, the PID gains, parameter uncertainties, and Extended Kalman Filter (EKF) parameter updates to run through a six-degrees-of-freedom (6DOF) simulation of the arbitrary nano/micro launch vehicle, the 6DOF simulation operating in Monte-Carlo mode; the 6DOF simulation evaluating guidance control accuracy, flight control stability, and orbit-injection performance of the launch vehicle.

2. The method of claim 1, wherein the launch vehicle prerequisite data includes structural data of the launch vehicle.

3. The method of claim 2, wherein the structural data includes material, stiffness, mass distribution, elastic modes and frequencies.

4. The method of claim 1, wherein the launch vehicle prerequisite data includes aerodynamic data of the launch vehicle.

5. The method of claim 4, wherein the aerodynamic data includes force and moment aerodynamic coefficients and longitudinal distribution of normal force coefficient.

6. The method of claim 1, wherein the low-pass filter design is an elliptic filter.

7. The method of claim 1, wherein the low-pass filter design suppresses control-excitation of structural modes.

8. The method of claim 1, wherein the control system gains are determined using a Nichols linear time-invariant process.

9. The method of claim 1, wherein the control system gains are proportional and integral angular-velocity control system gains.

10. The method of claim 1, wherein the Extended Kalman Filter (EKF) parameter updates are generated by executing the EKF at a fast rate to continuously update state estimates for guidance and control.

11. The method of claim 1, wherein the EKF converges on sensor error corrections and state vector values within a plurality of seconds.

* * * * *